United States Patent
Song

(10) Patent No.: US 10,550,824 B2
(45) Date of Patent: Feb. 4, 2020

(54) WIND POWER GENERATION TOWER

(71) Applicant: ODIN ENERGY CO., LTD., Seoul (KR)

(72) Inventor: Soo Yun Song, Seoul (KR)

(73) Assignee: ODIN ENERGY CO., LTD., Seoul (KR)

( * ) Notice: Subject to any disclaimer, the term of this patent is extended or adjusted under 35 U.S.C. 154(b) by 720 days.

(21) Appl. No.: 14/908,521

(22) PCT Filed: Dec. 30, 2013

(86) PCT No.: PCT/KR2013/012379
§ 371 (c)(1),
(2) Date: Jan. 28, 2016

(87) PCT Pub. No.: WO2015/016445
PCT Pub. Date: Feb. 5, 2015

(65) Prior Publication Data
US 2016/0208776 A1 Jul. 21, 2016

(30) Foreign Application Priority Data
Aug. 2, 2013 (KR) ........................ 10-2013-0091876

(51) Int. Cl.
*F03D 3/04* (2006.01)
*F03D 9/34* (2016.01)
(Continued)

(52) U.S. Cl.
CPC .............. *F03D 9/34* (2016.05); *F03D 3/005* (2013.01); *F03D 3/0409* (2013.01);
(Continued)

(58) Field of Classification Search
CPC .......... F03D 9/34; F03D 80/80; F03D 3/0409; F03D 3/0427
See application file for complete search history.

(56) References Cited

U.S. PATENT DOCUMENTS 4,269,563 A * 5/1981 Sharak ................. F03D 3/0427
415/186
5,391,926 A * 2/1995 Staley ................. F03D 3/0409
290/55
(Continued)

FOREIGN PATENT DOCUMENTS

JP 2005-282540 A 10/2005
JP 2010-196600 A 9/2010
(Continued)

OTHER PUBLICATIONS

International Search Report for International Patent Application No. PCT/KR2013/012379 filed Dec. 30, 2013.

*Primary Examiner* — Kayla Mccaffrey

(57) ABSTRACT

The present invention discloses a wind power generation tower. The wind power generation tower, according to one embodiment of the present invention, can implement wind power generation by accelerating wind speed even for low speed wind and simultaneously increasing the utilization efficiency of the wind which rotates blades, thereby improving overall power generation efficiency. In addition, the wind power generation tower, according to the one embodiment of the present invention, can increase the intensity of the wind by a Venturi effect and simultaneously increase the drop in pressure of the wind escaping the wind power generation tower by using the vortex generated at the rear surface of the wind power generation tower in a cylindrical shape, thereby improving the rotation of the blades provided to the inside of the wind power generation tower so as to enable faster rotation of the blades.

8 Claims, 8 Drawing Sheets

(51) Int. Cl.
  *F03D 80/80*   (2016.01)
  *F03D 3/00*    (2006.01)
  *F03D 3/06*    (2006.01)

(52) U.S. Cl.
  CPC ........... *F03D 3/0427* (2013.01); *F03D 3/061*
         (2013.01); *F03D 80/80* (2016.05)

(56) References Cited

U.S. PATENT DOCUMENTS

| | | | | |
|---|---|---|---|---|
| 6,870,280 | B2* | 3/2005 | Pechler | F03D 3/0427 |
| | | | | 290/55 |
| 6,935,841 | B2* | 8/2005 | Rainbow | F03D 3/005 |
| | | | | 415/124 |
| 2009/0092490 | A1* | 4/2009 | Brooks | F03D 3/0409 |
| | | | | 416/24 |
| 2010/0308597 | A1 | 12/2010 | Gyorgyi | |
| 2012/0014799 | A1* | 1/2012 | Mewburn-Crook | F03D 3/005 |
| | | | | 416/178 |

FOREIGN PATENT DOCUMENTS

| | | |
|---|---|---|
| JP | 5172967 B2 | 3/2013 |
| KR | 20-0427322 Y1 | 9/2006 |
| KR | 10-2010-0117240 A | 11/2010 |
| KR | 10-1059160 B1 | 8/2011 |
| KR | 10-2013-0055432 A | 5/2013 |

\* cited by examiner

WIND POWER GENERATION TOWER

TECHNICAL FIELD

The present invention relates to a wind power generation tower, and more particularly to a wind power generation tower having a vertical shaft wind power turbine in an interior thereof.

BACKGROUND ART

In general, a wind power generation system refers to a technology for converting a force of wind into a rotating force to produce electric power, and is a system for converting wind energy into mechanical energy, driving a generator, and producing electric power.

Such wind power generation systems are classified into horizontal shaft wind power generation systems and vertical shaft wind power generation systems. The horizontal shaft wind power generation systems show a high efficiency but are significantly influenced by the direction of wind, and the vertical shaft wind power generation systems are not significantly influenced by the direction of wind but the efficiency thereof is not as high as that of the horizontal shaft wind power generation systems. Accordingly, most main businesses related to wind power generation are intensively interested in horizontal shaft wind power generation, and considerably many studies on a method of increasing efficiency of the vertical shaft wind power generation are being conducted. However, a proper measure for increasing the efficiency of a vertical shaft wind power generation system has not been found yet. Meanwhile, the present invention relates to a vertical shaft wind power generation system, and thus a vertical wind power generation system will be described hereinbelow.

The vertical shaft wind power generation system has a technical advantage of utilizing wind blowing from all directions, but it is generally difficult to efficiently generate power because the direction and strength of wind are not constant by using the wind blowing in the atmosphere. Accordingly, various methods for effectively concentrating the direction of wind have been developed in an attempt to solve the problem, and for example, a measure of additionally adding a wind collection pipe structure having guide walls around a vertical shaft wind power turbine such that wind can flow in a constant direction and the speed of wind can be increased.

Korean Patent Application Publication No. 2009-0035884 (Acceleration type wind power generator) discloses a technology in which a wind power generator has a drag type wind power turbine in an interior thereof and a wind collection pipe structure for making the direction of wind constant and increasing the speed of wind at the same time is installed around the wind power turbine such that the efficiency of the vertical shaft wind power turbine can be increased.

Japanese Patent Application Publication No. 2010-531594 (Wind power turbine having vertical shaft) discloses a technology in which a drag type vertical shaft wind power turbine is provided in the interior of a wind power tower and a wind collection pipe structure for making the direction of wind constant and increasing the speed of wind at the same time is installed around the drag type vertical shaft wind power turbine.

However, each of the wind collection pipes disclosed in the patents is designed such that wind guided to the wind collection pipe directly contacts drag type wind power blades to induce rotation of the wind power blades, in which case it is difficult to consistently generate wind power as the movement of the drag type blades change in the same way according to the change of wind. Furthermore, because the wind having passed through the guide walls directly contacts the drag type blades so that resistance is considerably generated, the configuration is advantageous when the drag type blades are initially started but makes it difficult to effectively generate wind power as it acts as a resistance when the speed of wind is high.

Accordingly, the applicant of the present invention sought a wind power generation tower including a vertical shaft wind power turbine to solve the above-described technical problems.

DISCLOSURE

Technical Problem

Embodiments of the present invention provide a technology on a wind power generation tower which generates wind power even at a low speed and shows a maximum wind power generation efficiency.

Technical Solution

A wind power generation tower according to an embodiment of the present invention comprises: a wind collection part and an energy conversion part, the wind power generation tower having a plurality of layers of wind inlets, through which wind is introduced such that the introduced wind passes through an interior of the wind power generation tower and is discharged to the outside, wherein the wind collection part has a plurality of wind inlets and a plurality of wind outlets, a plurality of wind guide walls being, e.g., inclined at the same angle, and radially disposed along the center of the wind power generation tower such that the wind introduced via the wind inlets flows in one radial direction of the energy conversion part through the wind outlets, a vertical shaft wind power turbine having vertical blades in a space formed at the center of each of the layers of the wind power generation tower is installed in the energy conversion part such that a wind passage having at least 1 m is formed between the wind guide walls and the vertical blades, and the wind introduced via the wind inlets and the wind outlets of the wind collection part flows along the wind passage formed in one radial direction of the energy conversion part and is discharged to the outside of the wind power generation tower.

A ratio of cross-sections of the wind inlets and the wind outlets of the wind collection part may be 2.5:1 or more.

The vertical shaft wind power turbine may have lift type blades, and the vertical shaft wind power turbine may be a gyro mill type wind power turbine. A distance of the wind passage may be 1.5 m

Advantageous Effects

The wind power generation tower according to an embodiment of the present invention can realize wind power generation by accelerating wind even when the speed of the wind is low, and can improve entire power generation efficiency by increasing a use efficiency of wind rotating blades, thereby improving overall power generation efficiency.

In addition, the wind power generation tower according to an embodiment of the present invention can strengthen the strength of wind due to a Venturi effect and accelerate rotation of blades installed in an interior of a cylindrical wind power generation tower by making larger a pressure drop of the wind withdrawing from the wind power generation tower using vortices generated on a rear surface of the wind power generation tower.

MODE FOR INVENTION

Hereinafter, a wind power generation tower according to the present invention will be described in detail with reference to the accompanying drawings.

Figure 1:
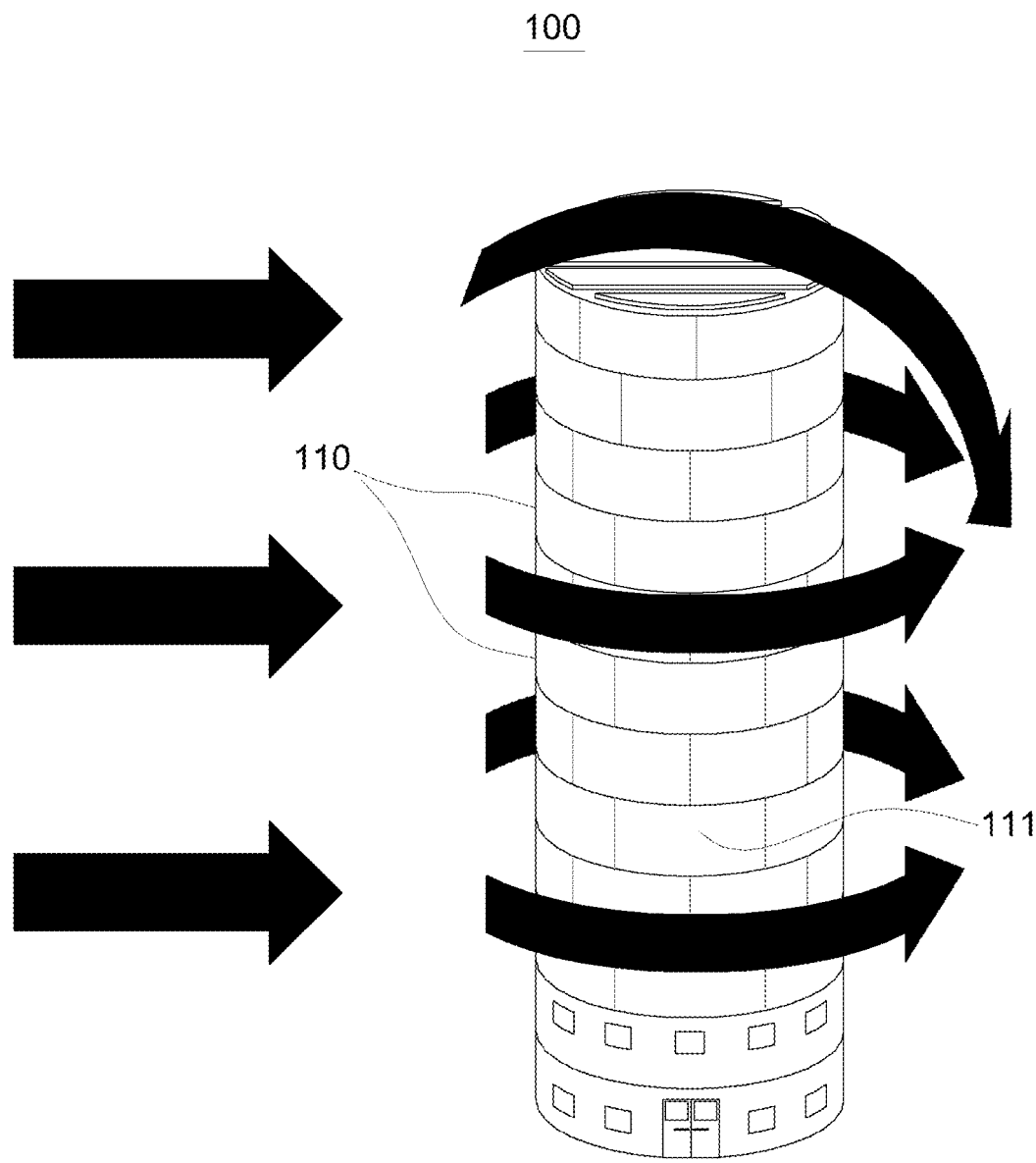
FIG. 1 is a view showing a wind power generation tower according to an embodiment of the present invention.

The applicant according to the present invention suggests a wind power generation tower having a plurality of layers (or tiers) of wind collection parts for amplifying wind strength while controlling the direction of wind as a measure for further amplifying strength of wind while more effectively concentrating the direction of wind in the surrounding air. FIG. 1 shows the wind power generation tower, and as shown in FIG. 1, the wind power generation tower 100 according to the present invention may have a plurality of layers of wind collection parts 110 including a plurality of wind inlets 111. Meanwhile, the wind flowing to the wind power generation tower 100 may pass through the wind inlets 111 of the wind power generation tower 110, or as shown in the drawings, may flow along both side (surfaces) and an upper side of the wind power generation tower 100. In this case, vortices (swirling flows) may be generated on a rear surface (side) of the wind power generation tower 100. The vortices generated on a rear surface of the wind power generation tower 100 are generated as long as the wind power generation tower 100 has a predetermined height and a predetermined volume irrespective of the shape of the wind power generation tower 100, but when the cross-section of the wind power generation tower 100 generally has a circular shape, vortices are generated on a side opposite to the side where wind is introduced into the wind power generation tower 100. Accordingly, the wind power generation tower 100 according to the present invention may have a cylindrical shape.

Figure 2:
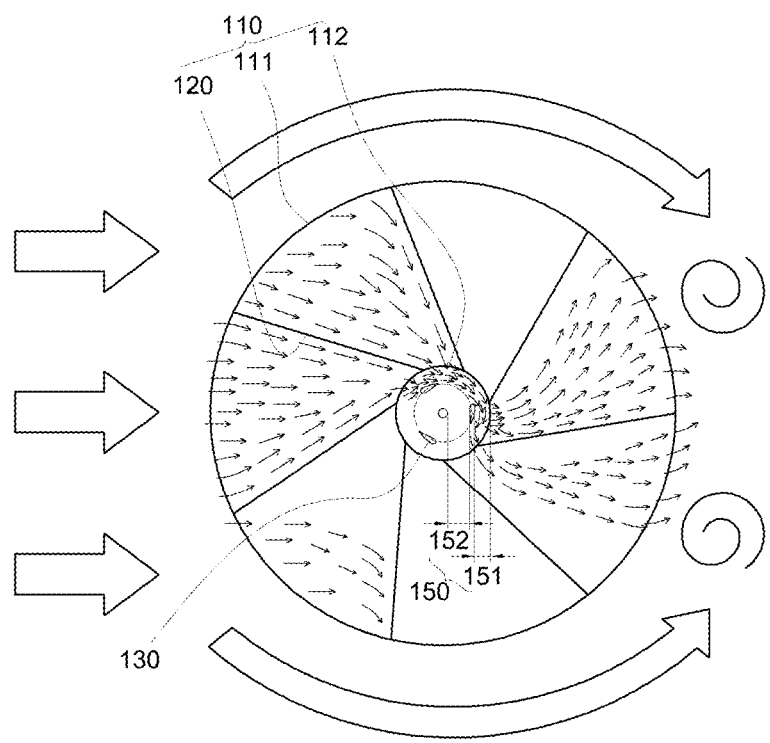
FIG. 2 is a cross-sectional view of the wind power generation tower shown in FIG. 1.

FIG. 2 shows a cross-section of one layer of the wind power generation tower according to the present invention. Referring to FIG. 2, the wind power generation tower 100 according to the present invention may have a wind collection part 110 and an energy conversion part 150. As described above, the wind collection part 110 may be formed by disposing a plurality of wind guide walls 120 radially with respect to the center of the wind power generation tower 100 such that the cross-sections of a wind inlet 111 and a wind outlet 112 are different from each other by a predetermined level or more so that the direction of the wind introduced into the wind inlet 111 of the wind power generation tower 100 may be controlled and the strength of the wind may be amplified. Here, the difference between the cross-sections of the wind inlet 111 and the wind outlet 112 may be formed such that wind speed is increased by a Venturi effect at a low wind speed of 5 m/s or less.

Figure 3:
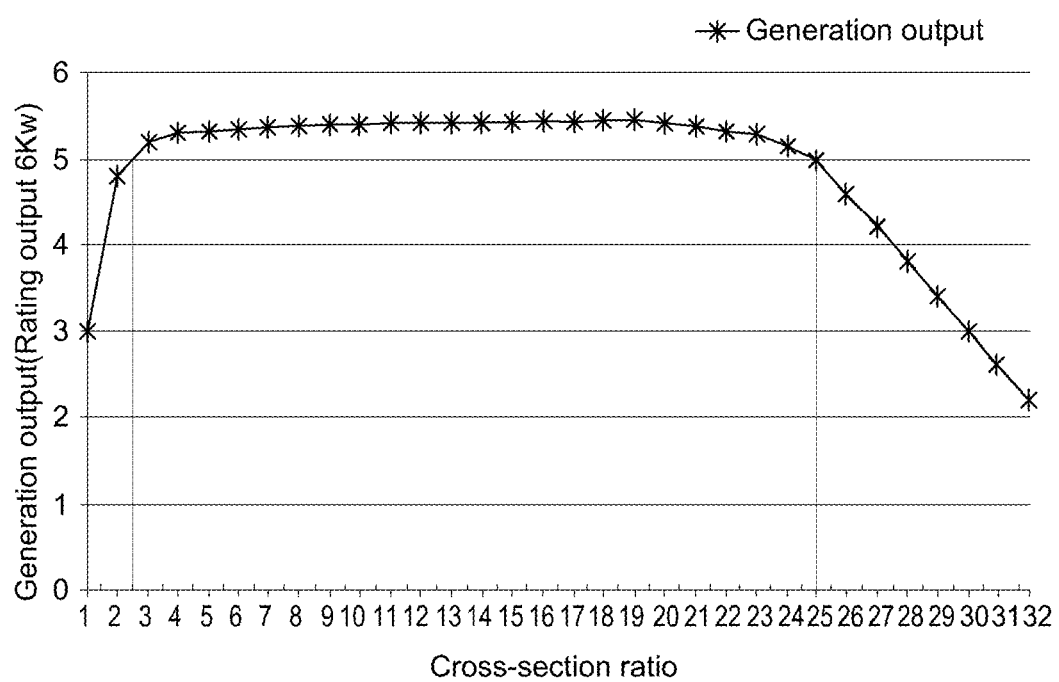
FIG. 3 shows power generation outputs for sections of a wind inlet and a wind outlet shown in FIG. 2.

FIG. 3 shows power generation outputs for the cross-sections of the wind inlet 111 and the wind outlet 112 of the wind collection part 110. FIG. 3 shows a result obtained by experimenting with an actual tower installed in Jeju Island (Korea) by the applicant, in which a wind power generator having a rated output of 6 KW was experimented with, and when the ratio of the cross-sections of the wind inlet 111 and the wind outlet 112 was changed to 1:1 or more, a cross-section ratio by which a suitable Venturi effect can be achieved was sought by measuring an output measured by the wind power generator installed in the actual tower. It can be seen in the experimental result that an output of 5 KW or more, which is admitted as commercial power when the ratio of cross-sections of the wind inlet 111 and the wind outlet 112 is about 2.5:1, is generated, considering that a range of an output admitted as commercial power is about 5 KW in a wind power generator. Accordingly, an effect of increasing the speed of wind in the wind collection part 110 of the wind power generation tower 100 can be realized by setting the ratio of the cross-sections of the wind inlet 111 and the wind outlet 112 of the wind collection part 110 installed in the wind power generation tower 100 according to the present invention to a minimum of about 2.5:1.

It is preferable that the wind guide walls 120 are designed to have a suitable number of wind inlets 111 such that the wind introduced into the wind power generation tower 100 is effectively discharged to the outside. Accordingly, in the wind power generation tower 100 according to the present invention, the wind introduced into the wind power generation tower 100 may be effectively discharged to the outside by installing at least five to nine wind guide walls 110.

Figure 4:
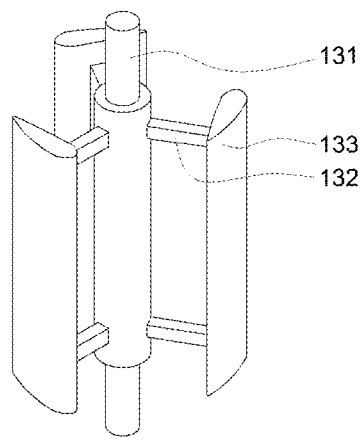
FIG. 4 shows an embodiment of a gyro mill type wind power turbine installed within the wind power generation tower according to the embodiment of the present invention.

A vertical shaft (axis) type wind power turbine is installed in the energy conversion part 150 formed in a central space of each of the layers of the wind power generation tower 100. The vertical shaft type wind power turbine installed in the wind power generation tower 100 according to the present invention may be either a drag type wind power turbine or a lift type wind power turbine. Meanwhile, a lift type wind power turbine is installed as the vertical shaft type wind power turbine in the embodiment of the present invention, and will be described based on an embodiment in which a gyro mill type wind power turbine 130 is installed. FIG. 4 shows an embodiment of the gyro mill type wind power turbine 130, and the gyro mill type wind power turbine may include a central shaft 131, a gyro mill type wind power blade 133 having a streamlined shape and rotated by a lifting force, and a support shaft 132 connecting the central shaft 131 and the gyro mill type wind power blade 133.

The energy conversion part 150 is a space for converting wind energy into mechanical energy while the wind having passed through the wind collection part 110 passes through the energy conversion part 150, and may include a wind passage 151 defined by a space between the gyro mill wind power blade 133 and an end of the wind guide wall 120, and an inner passage 152 defined as a space between the central shaft 131 of the gyro mill type wind power turbine 130 and the gyro mill type wind power blade 133, with respect to the gyro mill type wind power blade 133 of the gyro mill type wind power turbine 130.

The gyro mill type wind power turbine 130 is technically similar to a Darrieus wind power turbine in that it is driven by a lifting force, but the solidity of the gyro mill type wind power turbine 130 is higher than that of the Darrieus wind power turbine and TSR (Tip Speed Ratio) thereof is lower than that of the Darrieus wind power turbine in that the gyro mill type wind power turbine 130 is formed such that the gyro mill type wind power blade 133 is streamlined and has a finite length. Here, the solidity of a wind power turbine refers to a ratio of a length occupied by a blade to a rotation radius of the blade at any predetermined radial position, and the TSR refers to a ratio of a speed of wind to a speed of an end of a blade. That is, if the speed of wind and the speed of an end (tip) of a blade are the same, the TSR is 1.

Meanwhile, because the solidity of the gyro mill type wind power turbine 130 according to the embodiment of the present invention is considerably high unlike the Darrieus wind power turbine, lifting force is considerably decreased as the TSR increases due to an interference between the gyro mill type wind power blades 133 and a reduction of the speed of the wind introduced to the blades located at a downstream side of the gyro mill type wind power blades 133.

Figure 5:
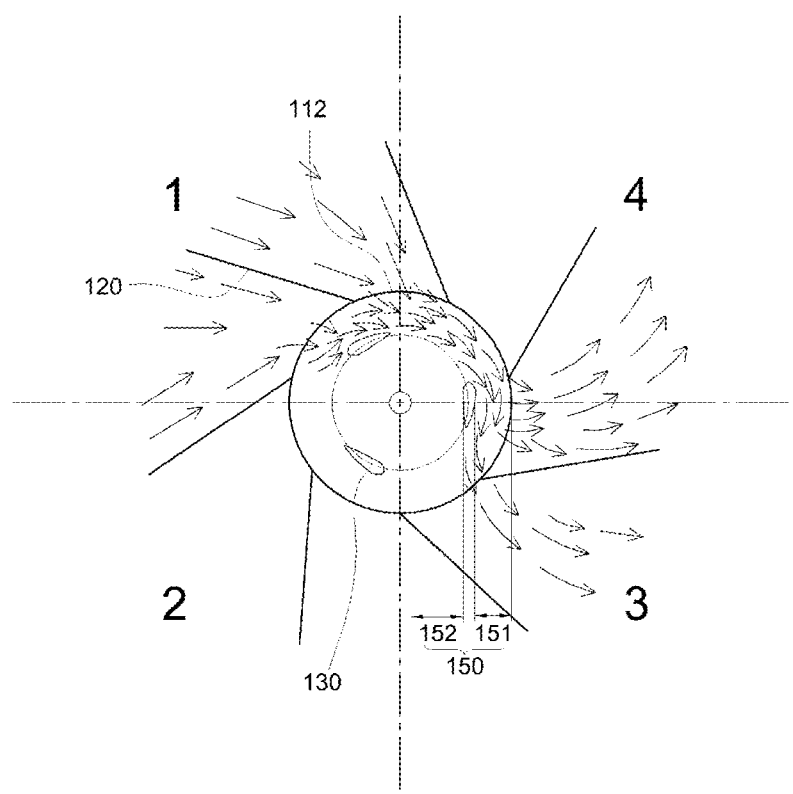
FIG. 5 is an enlarged view of a wind collection part and an energy conversion part shown in FIG. 2.
Figure 6A:
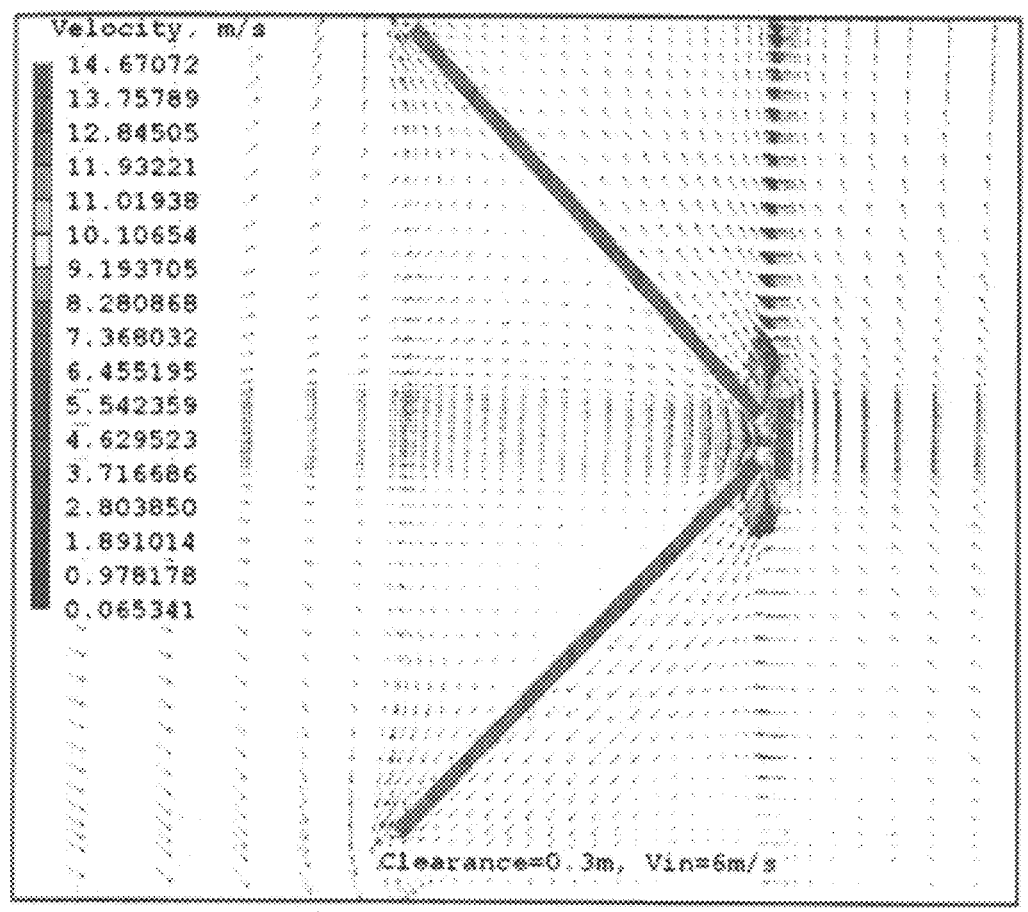
FIGS. 6A to 6D show speed changes of wind discharged from the wind outlet according to a distance change of a wind passage in the wind power generation tower according to the present invention.
Figure 6B:
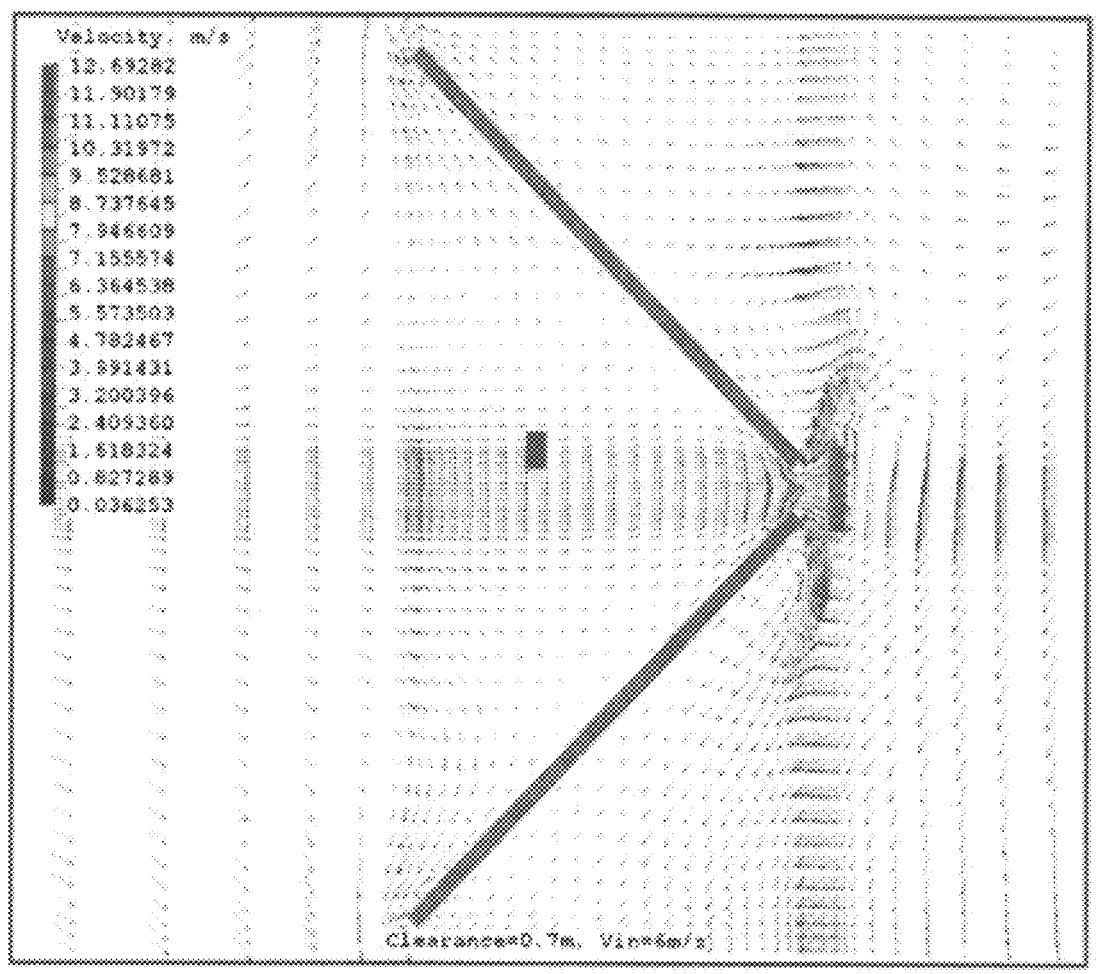
Figure 6C:
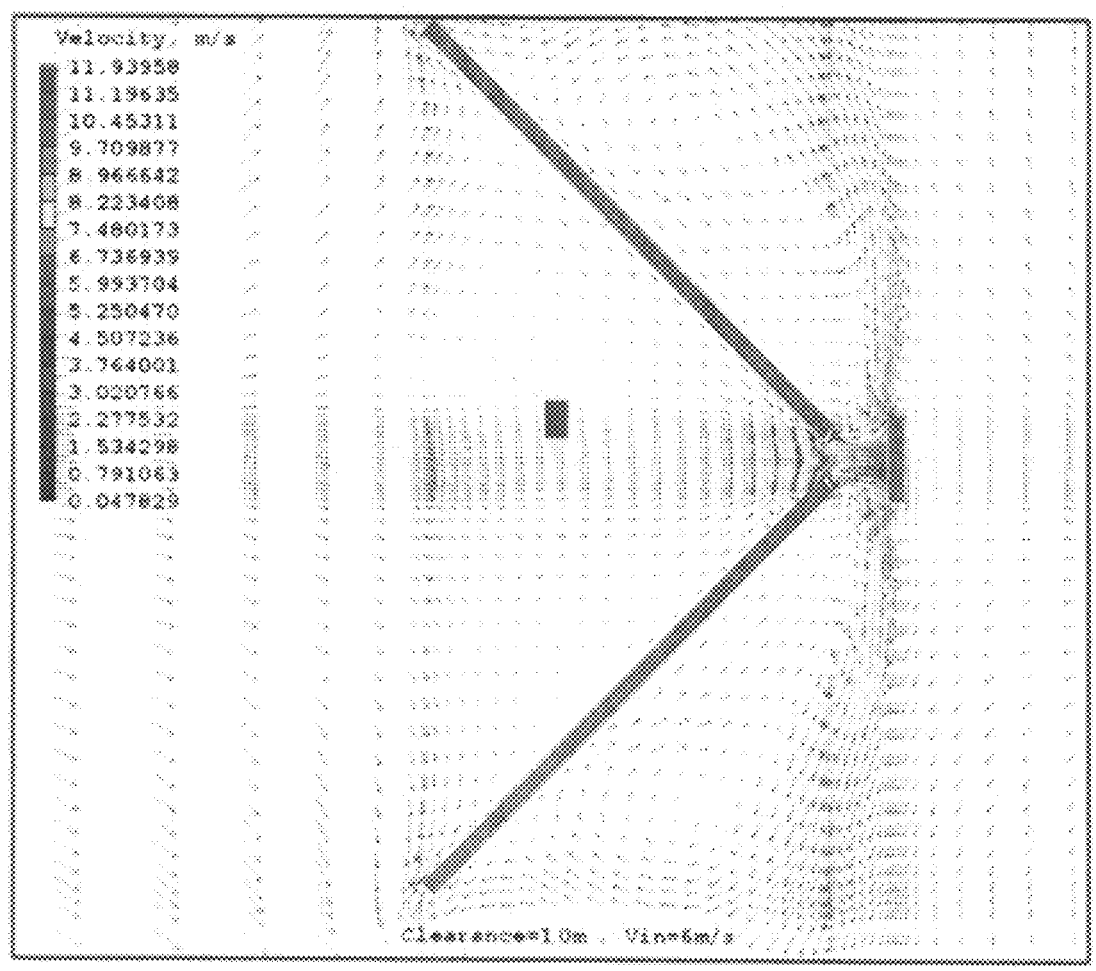
Figure 6D:
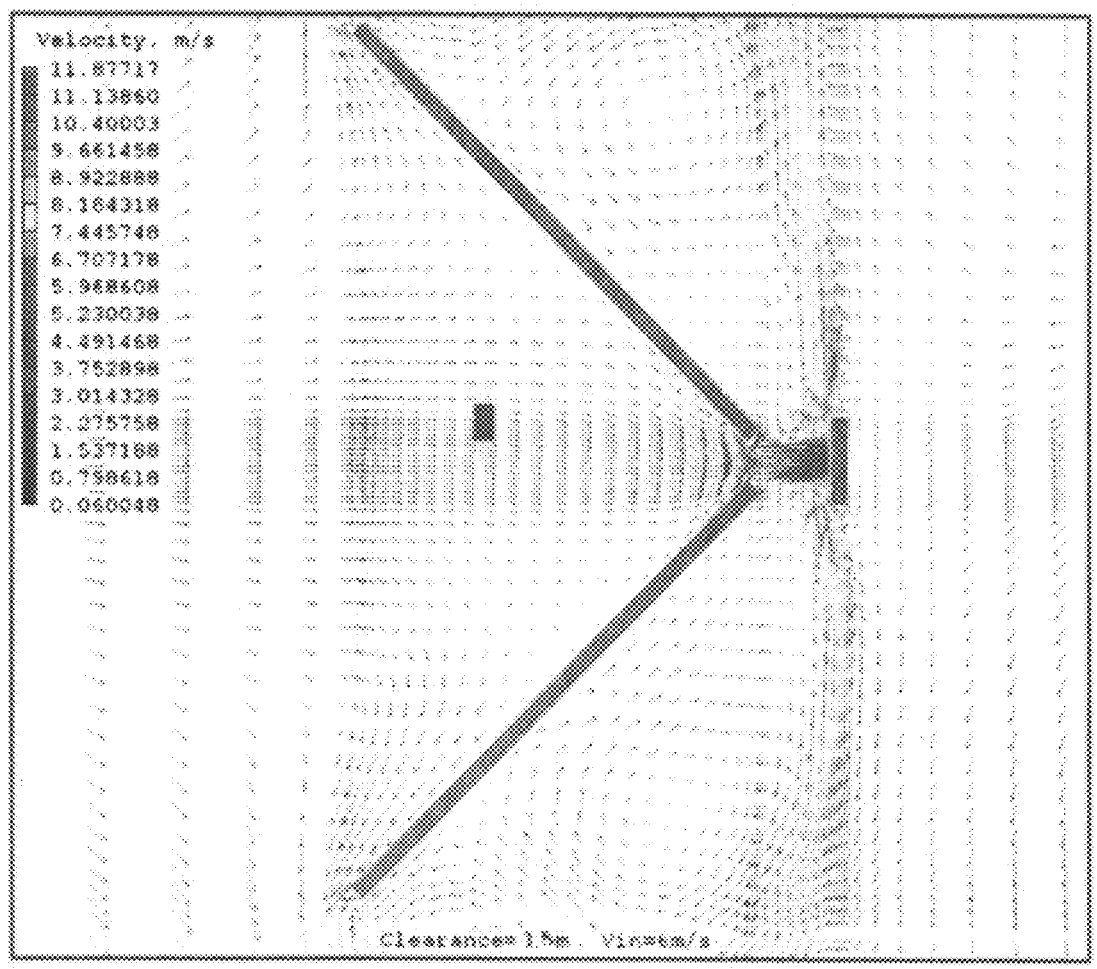

Accordingly, the applicant improved the structure of the wind power generation tower 100 according to the present invention to maximally overcome the disadvantages while strengthening the technical advantages. In more detail, as shown in FIGS. 2 and 5, the plurality of wind guide walls 120 may be inclined at a constant (or the same) angle along the center of the wind power generation tower 100 such that the wind introduced through the wind inlets 111 can flow in a radial direction of the energy conversion part 150. Accordingly, as shown in the drawings, the wind having passed through the wind collection part 110 flows through a wind passage 151 along a radial direction of the energy conversion part 150. In addition, it is important that the energy conversion part 150 of the wind power generation tower 100 according to the embodiment of the present invention is designed to have a wind passage 151 large enough to smoothly rotate the gyro mill type wind power blade 133.

Because the gyro mill type wind power blades 133 are rotated by a lifting force unlike the drag type vertical shaft turbine according to the related art, front and rear ends of the gyro mill type wind power blades 133 require space through which wind sufficiently flows. Accordingly, the present invention is designed such that a space between the central shaft 133 of the gyro mill type wind power turbine 130 and the gyro mill type wind power blades 133 is defined as an inner passage 152 and a space between the gyro mill type wind power blades 133 and the wind guide walls 120 of the wind collection part 110 is defined as a wind passage 151, and the space through which wind can sufficiently flow is secured through the wind passage 151.

FIGS. 2 and 5 show the technical features of the present invention. Referring to FIGS. 2 and 5, the wind having passed through the wind collection part 110 may flow along the wind passage 151 formed in a radial direction of the energy conversion part 150. In addition, the energy conversion part 150 of the wind power generation tower 100 according to the present invention can restrain the speeds of the blades from being decreased by a drag force generated at a downstream side of the gyro mill wind power turbine 130 according to the related art because the energy conversion part 150 of the wind power generation tower 100 according to the present invention rarely generates wind flows at an opposite radial direction thereof.

Furthermore, in the wind power generation tower 100 according to the present invention, it is most important to properly set the distance of the wind passage 151 in order to effectively increase the rotation efficiency of the gyro mill type wind power turbine 130 installed in the energy conversion part 150. Meanwhile, in order to properly set the distance of the wind passage 151, the speed change of the wind passing through the wind outlets 112 is measured when the wind passing through the wind outlets 112 of the wind collection part 110 contacts the gyro mill type wind power blades 133, results of which are shown in FIGS. 6A to 6D. The distance of the wind passage 151 is 0.3 m in FIG. 6A, 0.7 m in FIG. 6B, 1 m in FIG. 6C, and 1.5 m in FIG. 6D. Referring to the drawings, it can be seen that the speed of the wind discharged through the wind outlets 112 changes according to the distance change of the wind passage 151. In more detail, it can be seen that a resistance of the passage decreases as the distance of the wind passage 151 increases such that the speed of the wind discharged through the wind outlets 112 increases. According to the experimental result, it can be seen that the resistance of the passage considerably decreases if the distance of the wind passage 151 becomes about 1.0 m or more. It can be seen that the speed of the wind discharged through the wind outlets 112 at a distance of about 1.5 m reaches a maximum point. Accordingly, according to the above-described result, the wind power generation tower according to the present invention is designed such that the distance of the wind passage 151 formed in the energy conversion part 150 of the wind power generation tower 100 is at least 1.0 in.

As described above, when the distance of the wind passage 151 is properly set, the gyro mill type wind power turbine 130 installed within the energy conversion part 150 is rotated while minimizing the resistance of the wind discharged through the wind outlets 112 of the wind collection part 110, and it is most important to properly set the distance of the wind passage 151 of the wind power generation tower 100 according to the present invention because the wind power generation tower 110 has a sufficient wind flow space through which the lift blades can generate a rotating force.

Meanwhile, as described above, the wind passage 151 formed in the energy conversion part 150 of the wind power generation tower 100 according to the present invention is necessary to further increase the strength of the wind in the energy conversion part 150 of the wind power generation tower 100 through the flow of the wind generated by the wind power generation tower 100, in addition to the purpose of forming a flow of wind for smoothly generating a lifting force of the wind power blades 133 of the gyro mill type wind power turbines 130. FIG. 1 exemplarily shows a flow of the wind flowing through the wind power generation tower 100 according to the present invention, and the wind flowing through the wind power generation tower 100 may be wind flowing on both side surfaces and an upper surface of the wind power generation tower 100 in addition to the wind flowing through the interior of the wind power generation tower 100 via the wind inlets 111 of the wind collection part 110. In this case, as shown in FIG. 2, vortices having a relatively low pressure are generated on a side opposite to a side through which the wind of the wind power generation tower 100 is introduced. Accordingly, the wind discharged to the outside through the interior of the wind power generation tower 100 experiences a larger pressure drop due to the vortices, and thus the wind flowing along the wind passage 151 in the interior of the wind power generation tower 100 may be discharged to the outside of the wind power generation tower 100 at a more rapid speed.

In more detail, the wind discharged in an opposite direction of the wind power generation tower 100 via the wind passage 151 in the energy conversion part 150 generates a considerably large pressure difference between the energy conversion part 150 and the wind discharge space in which the vortices are formed due to the vortices formed in the wind discharge space at a side opposite to the side of the wind power generation tower 100, and the strength of the wind passing through the wind passage 151 of the energy conversion part 150 may be increased. Accordingly, the wind flowing along the wind passage 151 of the energy conversion part 150 is influenced by the pressure difference generated by the above-described vortices, and the effect considerably influences the rotating force of the gyro mill type wind power blades formed in the energy conversion part 150.

Accordingly, as described above, in order to improve the efficiency of the vertical shaft wind power turbine installed within the energy conversion part 150 using the vortices generated according to the flow of the wind generated by the wind power generation tower 100, it is necessary to install the wind passage 151 in the energy conversion part 150. If the wind passage 151 is not properly installed in the energy conversion part 150, the effect of increasing the strength of the wind flowing in the energy conversion part 150 generated by the pressure difference due to the wind generated by the wind power generation tower 100 does not influence the rotating force of the vertical shaft wind power turbine installed in the energy conversion part 150.

Accordingly, as described above, the wind passage formed in the energy conversion part 150 of the wind power generation tower 100 according to the present invention can cause a smooth rotating force of the gyro mill type wind power turbine 130, and can increase the strength of the wind due to a pressure drop generated by vortices generated by a flow of wind flowing along the wind power generation tower 100.

The wind power generation tower 100 including a gyro mill type wind power turbine according to the present invention employs the gyro mill type wind power turbine 130, which is a vertical shaft wind power turbine, in the wind power generation tower 100, and according to the present invention, efficiency can be increased by about 50% or more as compared to the case in which the vertical shaft wind power turbine according to the related art is rotated in the surrounding air. This increases a flow rate and a strength of wind flowing through the energy conversion part 150 through the configurations of the wind collection part 110 and the energy conversion part 150 in addition to an effect of increasing the strength of the wind due to the Venturi effect of the wind collection part 110, thereby increasing energy applied to the gyro mill type wind power turbine 130 and the wind in the energy conversion part 150 can be made to more rapidly flow by the pressure difference due to the vortices generated by the flow of the wind directly generated by the wind power generation tower 100, so that the above-described effects can be achieved.

Meanwhile, although it has been described that the gyro mill type wind power turbine 130 is installed as the vertical shaft wind power turbine installed in the wind power generation tower 100, the technical feature of the present invention is not limited to the gyro mill type wind power turbine 130 and the present invention also may be applied to various vertical shaft wind power turbines installed in the wind power generation tower 100.

Although the exemplary embodiment of the present invention has been described, it will be appreciated by those skilled in the art that the present invention may be variously modified and changed by adding, changing, or removing constituent components without departing from the scope of the present invention described in the claims and the modifications or changes fall within the scope of the present invention

The invention claimed is:

1. A wind power generation tower comprising a wind collection part and an energy conversion part, the wind power generation tower having a plurality of layers of wind inlets, through which wind is introduced such that the introduced wind passes through an interior of the wind power generation tower and is discharged to the outside,
   wherein the wind collection part has a plurality of wind guide walls that are radially disposed along the center of the wind power generation tower such that the wind introduced inside the wind collection part flows in a fixed direction,
   wherein a vertical shaft wind power turbine having vertical blades in a space formed at the center of each of the layers of the wind power generation tower is installed in the energy conversion part such that a wind passage having a distance of at least one meter in a radial direction is formed between the wind guide walls and the vertical blades, and
   wherein the wind introduced inside the wind collection part flows along the wind passage in an opposite direction to a rotational direction of the vertical shaft wind power turbine, and is discharged to the outside of the wind power generation tower.

2. The wind power generation tower of claim 1, wherein the wind collection part further includes a plurality of wind inlets and a plurality of wind outlets, and a ratio of cross-sections of the wind inlets and the wind outlets of the wind collection part is 2.5:1 or more.

3. The wind power generation tower of claim 1, wherein the plurality of wind guide walls of the wind collection part are inclined at the same angle and radially disposed along the center of the wind power generation tower such that the wind introduced inside the wind collection part flows along the wind passage in the opposite direction to the rotational direction of the vertical shaft wind power turbine.

4. The wind power generation tower of claim 1, wherein the wind collection part further includes a plurality of wind inlets and a plurality of wind outlets, and the wind speed in the wind collection part of the wind power generation tower is increased by a pressure drop due to a ratio of cross-sections of each of the wind inlets and a corresponding one of the wind outlets which guide the wind towards the inside of the wind power generation tower, and
   wherein the speed of the wind passing through the interior of the wind power generation tower is increased by a pressure difference between vortices formed around a wind discharge space of the wind power generation tower.

5. The wind power generation tower of claim 1, wherein the wind power generation tower has a cylindrical shape.

6. The wind power generation tower of claim 1, wherein the vertical shaft wind power turbine has lift type blades.

7. The wind power generation tower of claim 1, wherein the vertical shaft wind power turbine is a gyro mill type wind power turbine.

8. The wind power generation tower of claim 1, wherein the distance of the wind passage is 1.5 m which maximizes efficiency of generating wind power.

* * * * *